US 6,529,788 B1

(12) United States Patent
Tani et al.

(10) Patent No.: US 6,529,788 B1
(45) Date of Patent: Mar. 4, 2003

(54) RECYCLING SYSTEM AND RECYCLING METHOD

(75) Inventors: Tatsuo Tani, Chiba (JP); Kiyoshi Sakai, Tokyo (JP); Yasushi Akiba, Tokyo (JP); Shohzoh Miyawaki, Saitama (JP); Teruzo Hasumi, Saitama (JP); Mitsuaki Urakawa, Kanagawa (JP); Tetsuo Yamaoka, Kanagawa (JP); Hisashi Ishijima, Kanagawa (JP); Hiroyasu Itou, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/460,763

(22) Filed: Dec. 14, 1999

(30) Foreign Application Priority Data

Dec. 15, 1998 (JP) .......................... 10-356816

(51) Int. Cl.7 .............................................. G06F 19/00
(52) U.S. Cl. .............................. 700/97; 700/95; 705/29
(58) Field of Search ....................... 700/95–97, 99–101, 700/103–106; 209/1–3; 703/1; 705/29

(56) References Cited

U.S. PATENT DOCUMENTS

| 5,235,384 | A | | 8/1993 | Oka et al. |
| 5,436,843 | A | * | 7/1995 | Kamejima et al. ........... 209/3.3 |
| 5,463,447 | A | | 10/1995 | Kurotori et al. |
| 5,678,158 | A | | 10/1997 | Kurotori et al. |
| 5,765,087 | A | | 6/1998 | Yano et al. |
| 5,852,560 | A | * | 12/1998 | Takeyama et al. .......... 700/106 |
| 5,880,959 | A | * | 3/1999 | Shah et al. ................... 700/97 |
| 5,965,858 | A | * | 10/1999 | Suzuki et al. ............... 209/630 |
| 6,006,045 | A | | 12/1999 | Miyawaki |
| 6,032,001 | A | | 2/2000 | Miyawaki |
| 6,249,714 | B1 | * | 6/2001 | Hocaoglu et al. ............ 700/28 |

FOREIGN PATENT DOCUMENTS

| JP | 5-342224 | 12/1993 |
| JP | 7-130295 | 5/1995 |
| JP | 7-303873 | 11/1995 |
| JP | 7-306891 | 11/1995 |
| JP | 7-334583 | 12/1995 |
| JP | 9-277142 | 10/1997 |
| JP | 9-319790 | 12/1997 |
| JP | 10-34122 | 2/1998 |
| JP | 10-216689 | 8/1998 |
| JP | 10-222572 | 8/1998 |

OTHER PUBLICATIONS

T. Tani, pp. 1–5, "Recycling Design for a Copying Machine," 1994 (with partial English Translation).

* cited by examiner

Primary Examiner—Leo Picard
Assistant Examiner—Paul Rodriguez
(74) Attorney, Agent, or Firm—Oblon, Spivak, McClelland, Maier & Neustadt, P.C.

(57) ABSTRACT

A recycling system has a recycle information memory database for storing as recycle information, the information on all reutilizable products such as products produced or used under the management of the system, products treated as wastes, and products currently being used in the market. A virtual recycle product designing section is provided for estimating times when the reutilizable products are recovered as products usable for recycling as well as their volumes, based on the recycle information stored in the recycle information memory database. A production scheduling section is provided for setting a production schedule of a recycle product using the reutilizable products based on the estimated times and volumes.

49 Claims, 10 Drawing Sheets

FIG.2

| LIFE CYCLE STAGE No. | LIFE CYCLE STAGE | DETAILED CONTENTS OF BEHAVIORS |
|---|---|---|
| 1 | PRODUCTION OF RAW MATERIALS | MINING FROM THE EARTH/WASTE OF A BYPRODUCT/REFINING |
| 2 | PRODUCTION OF MATERIALS (USING NEW RAW MATERIALS OR REPRODUCED RAW MATERIALS) | PROCESSING AND MIXING OF A RAW MATERIAL TO FORM A PROCESSABLE SHAPE OF A PART |
| 3 | PRODUCTION OF PARTS (USING NEW PARTS OR REPRODUCED PARTS) | DETERMINING A MATERIAL TO BE EMPLOYED (INCLUDING A TOXIC MATERIAL). PROCESSING AND COMBINING. |
| 4 | ASSEMBLING A PRODUCT (USING NEW PARTS OR REPRODUCED PARTS) | DETERMINING A REUSED PART TO BE ASSEMBLED INTO A PRODUCT. DETERMINING A DESTINATION OF A REUSED PART TO BE ASSEMBLED INTO A PRODUCT. ORDERING, STOCK MANAGEMENT AND BUILDING OF A PART. RECORDING INFORMATION ON A BUILT-IN REUSED PART. |
| 5 | SELLING A PRODUCT (USING NEW PARTS OR REPRODUCED PRODUCT) | TRANSMITTING A LEVEL OF CLEANLINESS OF A PRODUCT PRODUCT TRANSFER AND PROCESSING OF A PACKAGING MATERIAL |
| 6 | USE/MAINTENANCE OF A PRODUCT | AMORTIZATION AND REPLENISHMENT OF SUPPLY PARTS REPLACING ABRADED OR DETERIORATED PARTS |
| 7 | OWN REPRODUCTION | OWN REPRODUCTION (SUCH AS PAPER) |
| 8 | RECOVERY/SELECTING OF A PRODUCT | RECOVERY TRANSPORTATION AND STORING OF A PRODUCT SELECTING A PRODUCT TO BE REPRODUCED (DECISION MAKING ON USE OR NON-USE) |
| 9 | REPRODUCTION OF A PRODUCT | CLASSIFICATION OF A PRODUCT (EXCLUDING A PREDETERMINED PART) CLEANING/DRYING OF A PRODUCT AND PARTS ASSEMBLING AND SPECIAL INSPECTION OF PARTS PRODUCT INSPECTION |
| 10 | FRAGMENTATION/CLASSIFICATION OF A PRODUCT | TAKING OUT A PART FROM A PRODUCT SELECTING A PART TO BE REUSED (DECISION MAKING ON USE OR NON-USE) DISASSEMBLING INTO A SINGLE MATERIAL (EXCLUDING DIFFERENT MATERIAL S) CLASSIFIED COLLECTION OF SINGLE MATERIAL PARTS COLLECTING THE SAME PARTS UP TO CONSTITUENT RAW MATERIAL ELEMENTS TAKING OUT TOXIC MATERIALS/SINGLE COLLECTION/DISPATCH |
| 11 | REPRODUCTION OF A PART | CLEANING OF A PART AND INSPECTION REPRODUCTION OF A PART AND INSPECTION (EXCLUDING/RE-ADDITION OF A PART OF CONSTITUENT ELEMENTS) |
| 12 | USING A REPRODUCED PART (OPEN RECYCLE) | REUSING AS A PART OF OTHER FIELD |
| 13 | SHREDDING A PART | SHREDDING A SINGLE MATERIAL PART. CLEANING A SHREDDER (IN THE CASE OF A COMMON USE OF THE SHREDDER) SHREDDING A PLURALITY OF MATERIALS FOR A PLURALITY OF PARTS/CLASSIFYING MATERIALS (A MAIN BODY AFTER TAKING OUT PARTS, ETC.) |
| 14 | REPRODUCTION OF A MATERIAL | CONFIRMING QUALITY AND PRICES OF MATERIALS FOR REPRODUCTION SOLVING A MATERIAL/ADJUSTING A MIXING COMPONENT WITH A VIRGIN MATERIAL (SECURING A FUNCTION, ETC.) |
| 15 | USING REPRODUCT (OPEN RECYCLE) | UTILIZING AS A MATERIAL IN OTHER FIELD |
| 16 | CHANGING INTO A RAW MATERIAL (CHANGING OIL, THERMAL/CHEMICAL CRACKING) | CLASSIFICATION OF A MATERIAL/(CLEANING) SOLVING A MATERIAL/EVAPORATING/CRACKING/COOLING AND CONDENSATION |
| 17 | CHANGING INTO A RAW MATERIAL (METALLURGY)(PRINTED CIRCUIT BOARD/SHREDDED DUSTS, etc) | ELIMINATING ORGANIC MATERIALS (ELIMINATION IS NOT REQUIRED DEPENDING ON THE CASE)REFINING (INPUT INTO COPPER REFINING PROCESS) |
| 18 | USING A REPRODUCED RAW MATERIAL (OPEN RECYCLE) | USING AS A RAW MATERIAL IN OTHER FIELD |
| 19 | RECOVERY OF THERMAL ENERGY | CHANGING INTO A SOLID FUEL INCINERATION/THERMAL EXCHANGE/TREATMENT OF EMISSION GAS AND RESIDUALS |
| 20 | RECLAMATION | RECLAMATION |

FIG.4

401 RECYCLE INFORMATION

| PRODUCT INFORMATION | | | | PART INFORMATION | | | | | MATERIAL INFORMATION | | | | |
|---|---|---|---|---|---|---|---|---|---|---|---|---|---|
| INITIAL MANUFACTURE INFORMATION | | CHANGE INFORMATION | | INITIAL MANUFACTURE INFORMATION | | CHANGE INFORMATION | | | INITIAL MANUFACTURE INFORMATION | | CHANGE INFORMATION | | |
| CONTENTS OF INFORMATION | LIFE CYCLE STAGE NO. | CONTENTS OF INFORMATION | LIFE CYCLE STAGE NO. | CONTENTS OF INFORMATION | LIFE CYCLE STAGE NO. | CONTENTS OF INFORMATION | LIFE CYCLE STAGE NO. | | CONTENTS OF INFORMATION | LIFE CYCLE STAGE NO. | CONTENTS OF INFORMATION | LIFE CYCLE STAGE NO. | |
| PRODUCT NAME | 4~10 | OWNER | 4~6, 8~10 | PART NAME | 3, 4, 11~13 | USE TIME | 3, 4, 6, 9~13 | | MATERIAL NAME | 2, 3, 10, 13~20 | MATERIAL COMPONENT | 2~4, 11~20 | |
| MACHINE TYPE NUMBER | | USER | 4~6, 8~10 | PART NUMBER | 3, 4, 11~13 | USE NUMBER OF PIECES | 3, 4, 6, 9~13 | | RAW MATERIAL COMPONENT | 2, 3, 10, 13~20 | COMPONENT RATIO | 2~4, 11~20 | |
| PRODUCT ID | 4~6, 8~10 | PLACE OF USE | 4~6, 8~10 | PART ID | 3, 4, 11~13 | STRESS HISTORY | 3, 4, 6, 9~13 | | COMPONENT RATIO | 2, 3, 10, 13~20 | MIXED VOLUME OF IMPURITY | 2~4, 11~20 | |
| COST | 4~6, 8~10 | USE PERIOD | 4~6, 8~10 | NAME OF MANUFACTURER | 3, 4, 11~13 | RECYCLE HISTORY | 3, 4, 6, 9~13 | | PRESENCE OR ABSENCE OF TOXIC SUBSTANCE | 2, 3, 10, 13~20 | | | |
| LOT NUMBER | 4~6, 8~10 | CV | 4~6, 8~10 | PLACE OF MANUFACTURE | 3, 4, 11~13 | INFORMATION ON QUALITY CHANGE | 3, 4, 6, 9~13 | | | | | | |
| PARTS MOUNTED | 4~6, 8~10 | REMAINING SERVICE LIFE | 4~6, 8~10 | DATE OF MANUFACTURE | 3, 4, 11~13 | HISTORY OF MOUNTED PRODUCT | 3, 4, 6, 9~13 | | | | | | |
| PLACE OF MANUFACTURE | 4~6, 8~10 | OPTION ADDITION /DELETION | 4~6, 8~10 | MOUNTED PRODUCT | 4 | PART REPRODUCTION INFORMATION | 3, 4, 6, 9~13 | | | | | | |
| NAME OF MANUFACTURER | 4~6, 8~10 | VERSION INFORMATION | 4~6, 8~10 | COST | 4~6, 8~10 | REMAINING SERVICE LIFE | 3, 4, 6, 9~13 | | | | | | |
| SPECIFICATIONS | 4~6, 8~10 | USE ENVIRONMENT | 4~6, 8~10 | CONSTITUENT MATERIAL | 4~6, 8~10 | FINAL TREATMENT INFORMATION | 12~20 | | | | | | |
| OWNER | 4~6, 8~10 | SERVICE MODE | 4~6, 8~10 | WEIGHT | 1~3, 10, 13~17 | | | | | | | | |
| USER | 4~6, 8~10 | REPAIR HISTORY (REPLACEMENT OF PARTS) | 4~6, 8~10 | SIZE | 1~5, 8, 10~14 | | | | | | | | |
| PLACE OF USE | 4~6, 8~10 | QUALITY HISTORY | 4~6, 8~10 | QUALITY INFORMATION (TOLERANCE, WITHSTANDING LOAD SERVICE LIFE) | 4, 6, 8~12 | | | | | | | | |
| SELLING MODE | 4~6, 8~10 | RECYCLE STATE INFORMATION | 4~6, 8~10 | REPRODUCIBLE MATERIAL STRUCTURE | 4, 13~20 | | | | | | | | |
| SERVICE MODE | 4, 6 | | | RECYCLED PART OR NOT | 4, 5, 8~20 | | | | | | | | |
| ESTIMATED SERVICE LIFE | 4~6, 8~10 | | | PROPORTION OF RECYCLED MATERIAL | 4,6,11,12,14~20 | | | | | | | | |
| RECYCLE PART INFORMATION | 4~6, 8~10 | | | DESIGN CHANGE INFORMATION | 4, 6, 10~13 | | | | | | | | |
| DESIGN CHANGE INFORMATION | 4~6, 8~10 | | | CONFORMITY INFORMATION | 4 | | | | | | | | |
| RECYCLING FACTOR | 4, 5 | | | | | | | | | | | | |
| CONFORMITY WITH OTHER TYPE OF MACHINE | 4, 6, 9, 10 | | | | | | | | | | | | |
| OPTION INFORMATION | 4 | | | | | | | | | | | | |
| MAINTENANCE SCHEDULE | 6 | | | | | | | | | | | | |
| NUMBER OF PRODUCTION | 4, 6, 8~10 | | | | | | | | | | | | |
| MANUFACTURING DATE | 4, 6, 8~10 | | | | | | | | | | | | |

FIG.5

| PRODUCT INFORMATION 402 | | | |
|---|---|---|---|
| INITIAL MANUFACTURE INFORMATION 405 | | CHANGE INFORMATION 406 | |
| CONTENTS OF INFORMATION | LIFE CYCLE STAGE NO. | CONTENTS OF INFORMATION | LIFE CYCLE STAGE NO. |
| PRODUCT NAME | 4~6, 8~10 | OWNER | 4~10 |
| MACHINE TYPE NUMBER | 4~6, 8~10 | USER | 4~6, 8~10 |
| PRODUCT ID | 4~6, 8~10 | PLACE OF USE | 4~6, 8~10 |
| COST | 4~6, 8~10 | USE PERIOD | 4~6, 8~10 |
| LOT NUMBER | 4~6, 8~10 | CV | 4~6, 8~10 |
| PARTS MOUNTED | 4~6, 8~10 | REMAINING SERVICE LIFE | 4~6, 8~10 |
| PLACE OF MANUFACTURE | 4~6, 8~10 | OPTION ADDITION/ DELETION | |
| NAME OF MANUFACTURER | 4~6, 8~10 | VERSION INFORMATION | 4~6, 8~10 |
| SPECIFICATIONS | 4~6, 8~10 | USE ENVIRONMENT | 4~6, 8~10 |
| OWNER | 4~6, 8~10 | SERVICE MODE | 4, 6 |
| USER | 4~6, 8~10 | REPAIR HISTORY (REPLACEMENT OF PARTS) | 4~6, 8~10 |
| PLACE OF USE | 4~6, 8~10 | QUALITY HISTORY | 4~6, 8~10 |
| SELLING MODE | 4~6, 8~10 | RECYCLE STATE INFORMATION | 4~6, 8~10 |
| SERVICE MODE | 4, 6 | | |
| ESTIMATED SERVICE LIFE | 4~6, 8~10 | | |
| RECYCLE PART INFORMATION | 4~6, 8~10 | | |
| DESIGN CHANGE INFORMATION | 4~6, 8~10 | | |
| RECYCLING FACTOR | 4, 5 | | |
| CONFORMITY WITH OTHER TYPE OF MACHINE | 4, 6, 9, 10 | | |
| OPTION INFORMATION | 4 | | |
| MAINTENANCE SCHEDULE | 6 | | |
| NUMBER OF PRODUCTION | 4, 6, 8~10 | | |
| MANUFACTURING DATE | 4, 6, 8~10 | | |

FIG.6

| PART INFORMATION | | | |
|---|---|---|---|
| INITIAL MANUFACTURE INFORMATION | | CHANGE INFORMATION | |
| CONTENTS OF INFORMATION | LIFE CYCLE STAGE NO. | CONTENTS OF INFORMATION | LIFE CYCLE STAGE NO. |
| PART NAME | 3, 4, 11~13 | USE TIME | 3, 4, 6, 9~13 |
| PART NUMBER | 3, 4, 11~13 | USE NUMBER OF PIECES | 3, 4, 6, 9~13 |
| PART ID | 3, 4, 11~13 | STRESS HISTORY | 3, 4, 6, 9~13 |
| NAME OF MANUFACTURER | 3, 4, 11~13 | RECYCLE HISTORY | 3, 4, 6, 9~13 |
| PLACE OF MANUFACTURE | 3, 4, 11~13 | INFORMATION ON QUALITY CHANGE | 3, 4, 6, 9~13 |
| DATE OF MANUFACTURE | 3, 4, 11~13 | HISTORY OF MOUNTED PRODUCT | 3, 4, 6, 9~13 |
| MOUNTED PRODUCT | 3, 4, 6, 8~10 | PART REPRODUCTION INFORMATION | 3, 4, 6, 9~13 |
| COST | 3~6, 11~13 | REMAINING SERVICE LIFE | 3, 4, 6, 9~13 |
| CONSTITUENT MATERIAL | 1~3, 10, 13~17 | FINAL TREATMENT INFORMATION | 12~20 |
| WEIGHT | 1~5, 8, 10~14 | | |
| SIZE | 1~5, 8, 10~14 | | |
| QUALITY INFORMATION (TOLERANCE, WITHSTANDING LOAD, SERVICE LIFE) | 4, 6, 8~12 | | |
| REPRODUCIBLE MATERIAL STRUCTURE | 4, 13~20 | | |
| RECYCLED PART OR NOT | 4, 5, 8~20 | | |
| PROPORTION OF RECYCLED MATERIAL | 4, 6, 11, 12, 14~20 | | |
| DESIGN CHANGE INFORMATION | 4, 6, 10~13 | | |
| CONFORMITY INFORMATION | 4 | | |

FIG.7

| MATERIAL INFORMATION | | | |
|---|---|---|---|
| INITIAL MANUFACTURE INFORMATION | | CHANGE INFORMATION | |
| CONTENTS OF INFORMATION | LIFE CYCLE STAGE NO. | CONTENTS OF INFORMATION | LIFE CYCLE STAGE NO. |
| MATERIAL NAME | 2, 3, 10, 13~20 | MATERIAL COMPONENT | 2~4, 11~20 |
| RAW MATERIAL COMPONENT | 2, 3, 10, 13~20 | COMPONENT RATIO | 2~4, 11~20 |
| COMPONENT RATIO | 2, 3, 10, 13~20 | MIXED VOLUME OF IMPURITY | 2~4, 11~20 |
| PRESENCE OR ABSENCE OF TOXIC SUBSTANCE | 2, 3, 10, 13~20 | | |

404, 405, 406

RECYCLING SYSTEM AND RECYCLING METHOD

FIELD OF THE INVENTION

The present invention relates to a recycling system and recycling method. More particularly this invention relates to a recycling system and recycling method for comprehensively managing a recycle processing from a stage of materials for constituting a product to a stage of a final solid waste treatment.

BACKGROUND OF THE INVENTION

In recent years, there have been proposed various recycling systems for using reutilizable products, parts and materials by recycling them from the viewpoints of effective utilization of resources, reduction in waste volumes, cost reduction, and protection of earth environments.

As one of prior-art recycling systems, there is "Product Recycling System" as disclosed in Japanese Patent Application Laid-open (JP-A) No. 7-334583. This system is structured to have an input section for inputting product information, a memory for storing database of information on product reutilization, a recycle processing method decision processor for making a decision on a recycle processing of a product based on a predetermined recycling rule, by referring to the information on reutilization of the product in the database stored in the memory based on the product information input in the input section, and a recycling plant facility controller for functioning as an output section for outputting a result of the decision to a next process. Based on this structure, this application aims at promoting proper recycling of waste products, saving additional energy consumption, reducing waste volumes, and preventing environmental pollution due to toxic wastes and the like.

There is also "Recyclable Constituent Elements Having Data Recorder For Storing Information For Inspecting Constituent Elements, And Product Having Said Elements" as disclosed in Japanese Patent Application Laid-open (JP-A) No. 7-130295. According to this application, there is provided a memory unit for storing information on, for example, a position of a material to be recycled and information on a specific stress to be received during the use of a constituent element of a product. By using the information stored in the memory unit, it is designed to be able to suitably inspect each constituent element of a product before it is sent for recycling, and to be able to easily evaluate each constituent element taken out from the product.

According to the above-described prior-art techniques, however, a recycling of a product is carried out based on a decision made as to whether or not the product is to be reutilized as a part or the product is to be used as a raw material, only after the product as a waste has been recovered from the market. In this way, it is possible to easily evaluate each constituent element taken out from the product or to promote a suitable recycling of the product recovered. However, as the recycling is based on the assumption of products recovered, it is not possible to carry out a planned recycling manufacturing of products using recycled parts or the like.

Further, according to the prior-art recycling systems, it has not been possible to carry out a planned utilization of products in the market as parts or materials for products to be recycled, as the products once sold in the market are actually under the control of the market until when they are recovered as wastes and not under the control of individual recycling systems.

SUMMARY OF THE INVENTION

It is an object of the present invention to provide a recycling system and recycling method capable of systematically producing a recycle product by using recycled parts.

It is another object of the present invention to provide a recycling system and recycling method capable of managing all the products in the recycling system after the products have been sold unit when they are recovered and capable of systematically utilizing the products in the market as parts and materials for a recycle product.

In order to achieve the above objects, in one aspect of the recycling system and recycling method according to the present invention, there are provided a recycle information memory unit for storing as recycle information, the information on all reutilizable products, parts and raw materials including products, parts and raw materials produced or used under the management of the system that are products, parts and raw materials treated as wastes and products, parts and raw materials currently being used in the market; a recycle recovery estimating unit for estimating times when the reutilizable products, parts and raw materials are recovered as products, parts and raw materials usable for recycling as well as their volumes, based on the recycle information stored in the recycle information memory unit; and a recycle production schedule setting unit for setting a production schedule of a recycle product using the reutilizable products, parts and raw materials based on the times and volumes estimated by the recycle recovery estimating unit.

Further, in another aspect of the recycling system and recycling method according to the present invention, there are provided a recycle information memory unit for storing as recycle information, the information on all reutilizable products, parts and raw materials including products, parts and raw materials produced or used under the management of the system that are products, parts and raw materials treated as wastes and products, parts and raw materials currently being used in the market; and a virtual recycle product designing unit for inputting planned contents of a virtual product, preparing at least one proposal of a composition of the virtual product, making a decision as to whether it is possible or not to compose the virtual product using the reutilizable products, parts and raw materials based on the composition proposal and the recycle information, and designing a virtual recycle product using the reutilizable products, parts and raw materials that can compose the virtual product based on a result of the decision.

Further, in still another aspect of the recycling system and recycling method according to the present invention, there are provided a recycle information memory unit for storing as recycle information, the information on all reutilizable products, parts and raw materials including products, parts and raw materials produced or used under the management of the system that are products, parts and raw materials treated as wastes and products, parts and raw materials currently being used in the market; a recycle recovery estimating unit for estimating. times when the reutilizable products, parts and raw materials are recovered as products, parts and raw materials usable for recycling as well as their volumes, based on the recycle information stored in the recycle information memory unit; a virtual recycle product designing unit for inputting planned contents of a virtual product, preparing at least one proposal of a composition of the virtual product, making a decision as to whether it is possible or not to compose the virtual product using the reutilizable products, parts and raw materials based on the composition proposal and the recycle information, and designing a virtual recycle product using the reutilizable products, parts and raw materials that can compose the virtual product based on a result of the decision; and a recycle production schedule setting unit for setting a production schedule of a recycle product using the reutilizable products, parts and raw materials, by inputting estimated recovery times and volumes of the corresponding products, parts and raw materials from the recycle recovery estimating unit, based on a result of the designing by the virtual recycle product designing unit.

Other objects and features of this invention will become apparent from the following description with reference to the accompanying drawings.

BRIEF DESCRIPTION OF THE DRAWINGS

FIG. 2 is a table for explaining contents of life cycle stages from No. 1 to No. 20 and detailed contents of behaviors shown in FIG. 1;

FIG. 4 is an explanatory drawing for showing one example of information (recycle information) necessary for registering in a recycle information memory database;

FIG. 5 is an explanatory drawing for showing detailed contents of product information as a part of the recycle information;

FIG. 6 is an explanatory drawing for showing detailed contents of part information as a part of the recycle information;

FIG. 7 is an explanatory drawing for showing detailed contents of material information as a part of the recycle information;

DESCRIPTION OF THE PREFERRED EMBODIMENTS

An embodiment of a recycling system and recycling method according to the present invention is explained below with reference to the attached drawings, in the following order:

1) Concept of the recycling system of the present invention
2) Recycling system of the present embodiment
3) Use of the recycling system of the present invention.

In the present specification, in order to simplify the explanation, a recycling system will be explained by taking a copying machine as one example. However, it is a matter of course that the recycling system of the present invention is not limited to the copying machine. In the recycling system of the present invention, a part may be structured by one material, or apart maybe a unit of parts (an aggregate of parts). They will be collectively called a part or parts.

1) Concept of the Recycling System of the Present Invention

To begin with, a concept of a recycling system of the present invention will be explained.

First, the recycling system of the present invention is a reyling system for comprehensively managing a recycle processing of parts for constituting a product, from a stage of materials to a stage of a final solid waste treatment. The comprehensive management of this recycle processing will be explained in detail later with reference to FIG. 1.

Second, according to the recycling system of the present invention, information on all reutilizable products, parts and raw materials is stored in advance as recycle information. Based on this recycle information, times when these products, parts and raw materials can be recovered as products, parts and raw materials for recycling are estimated together with their volumes. Then, based on the estimated times and volumes, a production schedule of a recycle product using the reutilizable products, parts and raw materials, is set.

Third, according to the recycling system of the present invention, at least one proposal of a composition of a virtual product is prepared by inputting a planned content of the virtual product. Based on the composition proposal and the recycle information, a decision is made as to whether it is possible or not to compose the virtual product using the reutilizable products, parts and raw materials. Then, based on a result of the decision, a virtual recycle product using the reutilizable products, parts and raw materials that can compose the virtual product, is designed.

Fourth, the estimated recovery times and volumes of products, parts and raw materials to be used for the virtual recycle product, are input based on a result of the designing of the virtual recycle product. Thus, a production schedule of the recycle product using the reutilizable products, parts and raw materials, is set.

Figure 1:
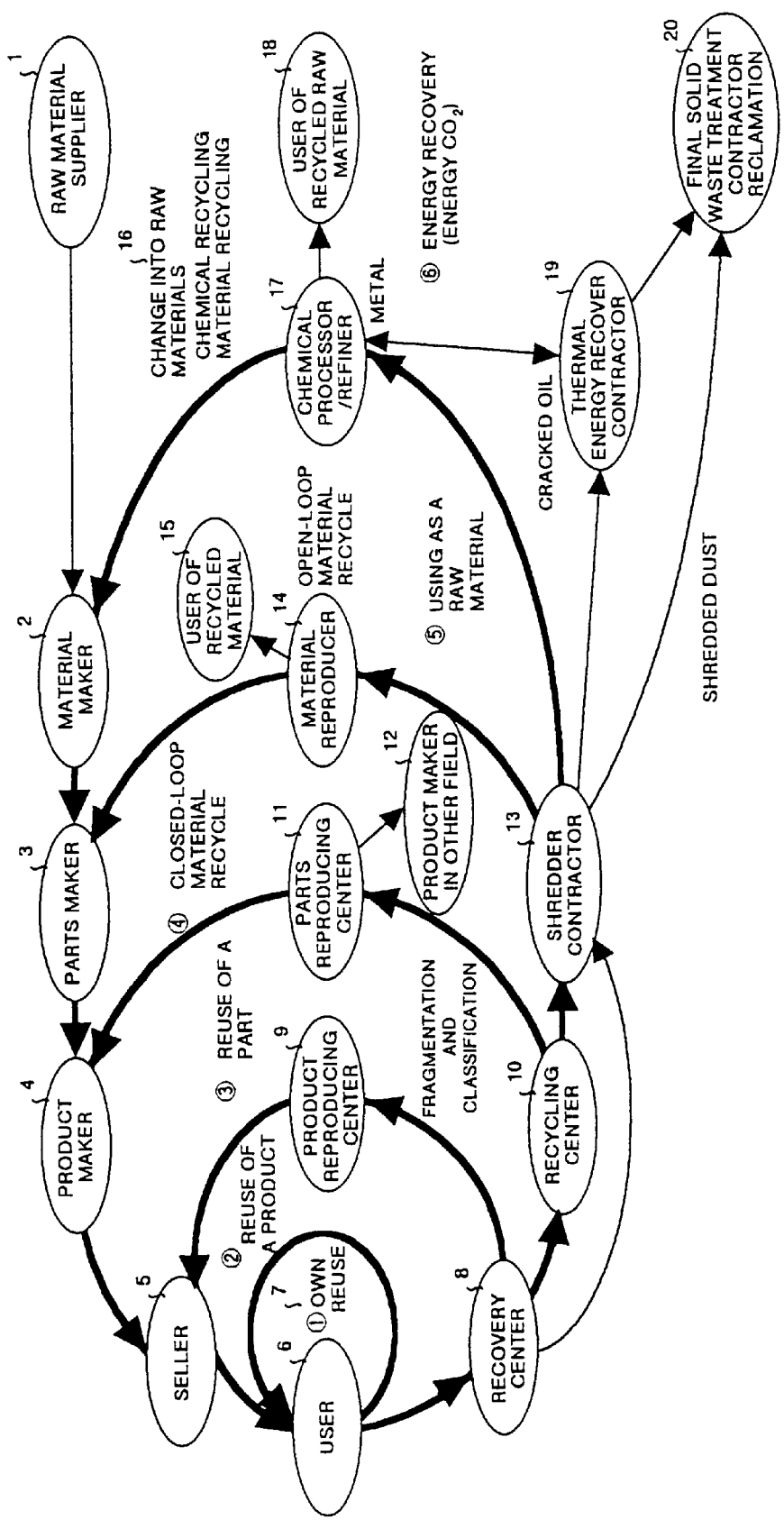
FIG. 1 is a conceptual drawing for showing a concept of a recycling system of the present invention as material flows from a stage of raw materials to a stage of waste treatment.

(1) Concept of the recycling system for comprehensively managing the recycle processing from a stage of materials to a final solid waste treatment stage:

FIG. 1 is a conceptual drawing for showing a concept of the recycling system of the present invention as material flows from a stage of a raw material to a stage of solid waste treatment. Recycling is very effective means for reducing consumption of resources, by delaying the period from a material stage to its waste stage. As recycle processing methods for delaying the period from a material stage to its waste treatment stage, there are various kinds of recycle processing as designated by (1) to (6) in the drawing.

Life cycle stages of products, parts and materials will be explained next with reference to material flows from the stage of a raw material to a stage of its solid waste treatment, shown in FIG. 1. In the drawing, reference numerals 1 to 20 denote life cycle stage numbers (hereinafter to be referred to as a stage No.).

Stage No. 1 shows a stage of production of a raw material. Generally, a raw material is produced and supplied by a raw material supplier.

Stage No. 2 shows a stage of producing a material by using a new raw material or a reproduced raw material. Generally, a material is produced and supplied by a material maker.

Stage No. 3 shows a stage of producing a part by using a new part or a reproduced part. Generally, a part is produced and supplied by a parts maker.

Stage No. 4 shows a stage of assembling a product by using a new product or a reproduced product. Generally, a product is assembled and supplied by a product maker.

Stage No. 5 shows a stage of selling a product using a new product or a reproduced product. Generally, a product is sold by a seller.

Stage No. 6 is a stage for showing a product using state/maintenance state. Generally, this shows a state that a product is being used by user (market).

Stage No. 7 is a stage for showing an own reproduction. This stage corresponds to a recycle processing of (1) described later.

Stage No. 8 is a stage for showing a recovery/selection of a product. Generally, a product is recovered from user (market) to a predetermined recovery center, and the product is selected to a next stage (stage No. 9 or stage No. 10).

Stage No. 9 is a stage for showing a reproduction of a product. Generally, a product is sent from the recovery center to a predetermined product reproduction center, for reproducing the product.

Stage No. 10 is a stage for showing a disassembling/classification of a product. Generally, a product is sent from the recovery center to a predetermined recycling center, for reproducing the product.

Stage No. 11 is a stage for showing a reproduction of a part. Generally, a part is sent from the recycling center to a predetermined parts reproducing center, for reproducing the part.

Stage No. 12 is a stage for showing a supply of a reproduced part to a product maker of other field. This corresponds to an open recycling.

Stage No. 13 is a stage for showing a fragmentation or crushing of a part (or a product). In this stage, a single material part is crushed, or a plurality of material parts are fragmented or classified. Generally, parts (products) are sent from the recycling center (the recovery center, depending on the case) to a predetermined shredder contractor, for fragmenting and classifying the parts (products).

Stage No. 14 is a stage for showing a reproduction of a material. A fragmented material that can be reused is sent from the preceding stage No. 13 to a material reproducer, for reproducing the material. When the reproduced material is sent to the parts maker (stage No. 3), this corresponds to a closed-loop material recycle processing to be described later. When the reproduced material is sent to a user of a recycled material (stage No. 15), this corresponds to an open-loop material recycle processing to be described later.

Stage No. 15 shows a stage of using a reproduced material. A reproduced material is sent from the stage No. 14 in the preceding stage to a user of the recycled material for their use of this material.

Stage No. 16 shows a stage of making a raw material from a recycled material. Shredded dusts are changed into the raw material by solving them into oil or heat/chemical cracking.

Stage No. 17 shows a stage of making a raw material from a recycled material. Printed substrates, shredded dusts, and the like are changed into a raw material by metallurgy.

Stage No. 18 shows a stage of using a reproduced raw material. A reproduced raw material is sent from the preceding stages No. 16 and No. 17 to a user of the recycled raw material.

Stage No. 19 shows a stage of recovering thermal energy. Thermal energy generated by incinerating shredded dusts is recovered by a thermal energy recovery contractor.

Stage No. 20 shows a stage of carrying out a final waste treatment. Generally, a final treatment contractor treats the solid wastes for reclamation or the like.

FIG. 2 is an explanatory table for summarizing detailed contents of behaviors corresponding to the life cycle stages from No. 1 to No. 20 shown in FIG. 1, respectively.

With reference to FIG. 1, the outline of the recycle processing from (1) to (6) and its effects in the recycling system of the present invention will be briefly explained in the sequence from the inner recycling group to the outer group.

(1) Own Reuse

This is a recycle processing for a user to reuse a part of a product by himself or herself. More specifically, this corresponds to a case where the user refills a toner into a toner container for refilling, for the user to reuse the container, for example. In this case, values of an object (a part to be reused) and its material are not degraded. It requires only minimum energy and minimum cost to recover to "a state of using by the user" which is a state of a highest value of the material.

(2) Reuse of a Product

This is a recycle processing for carrying out a predetermined reproduction processing to a recovered product, and reselling or reusing the recovered product. In this case, there is a large effect of reduction in environmental load, as most of parts and materials constituting the product are reused as they are.

(3) Reuse of a Part

This is a recycle processing for taking out a part from a recovered product, and reusing this part as a part of a new product. In this case, a part to be recycled is selected based on a service life of each part, amortization state, and a service life (product life) of a new recoduct. Generally, this has a large effect of reduction in environmental load, as the service lives of most of the parts are longer as compared with the life of the product.

(4) Material Recycle

This is a recycle processing for disassembling a recovered product, classifying parts into single materials, crushing and solving fragmented parts by heat, and using a result as a reproduced material. This recycle processing includes two types; a closed loop material recycling for reutilizing the material as a material for a product of the same field; and an open loop material recycling for reutilizing the material as a material of a product in other field. However, in the present embodiment, an explanation will be made basically by taking the closed loop recycling into consideration.

(5) Using as a Raw Material

This is a recycle processing for disassembling a recovered product, classifying parts into single materials, crushing and solving fragmented parts by heat, finally into a raw material, for reusing the reproduced raw material. For example, there are a chemical recycling for thermally or chemically disassembling a plastic material, for utilizing a result as a resin material, and a metallurgical recycling for taking out metal from shredded dusts by refining. The practicing of this recycle processing has a potential of achieving "no reclamation based on products" involving no direct waste treatment of materials.

(6) Energy Recovery (Thermal Recycling)

This is a recycle processing for incinerating plastics and the like, for recovering thermal energy. This recycle processing makes it possible to achieve an efficient utilization of energy.

In the recycling system of the present invention, all the above-described cycles of recycle processing from (1) to (6) are utilized as far as possible until a material reaches a final waste treatment stage, so that the life cycle of the material from the stage of a material to the stage of a final waste treatment is made longer, thereby to achieve effective utilization of resources.

Referring to the conceptual drawing of FIG. 1, it is a matter of course that, in the case of selecting a recycle processing, it is desirable to place a priority to the recycle processing of a smaller loop as far as possible in order to minimize energy and cost required to recover to "stage No. 6: the state of using by the user" which is the state of the highest value of the material.

2) Recycling System of the Present Embodiment

Next, there will be explained below a structure and an overall schematic flow of the recycling system of the present embodiment until a virtual recycle product is produced, with reference to a schematic configuration drawing of the recycling system of the present embodiment shown in FIG. 3.

A recycling system of the present embodiment is broadly structured by a virtual warehouse 101, a virtual recycle product designing section 102, a production scheduling section 103, a part procuring section 104, a producing section 105, and a selling section 106.

The virtual warehouse 101 assumes all utilizable (and reutilizable) products, parts and materials including products in the market, parts mounted on the products and materials constituting the parts, as a product/part/material warehouse 101a. Further, the virtual warehouse 101 manages the information on all the products, parts and materials on this product/part/material warehouse 110a in a recycle information memory database 101b.

In other words, the recycle information database 101b stores as recycle information, the information on all the reutilizable products, parts and raw materials including products, parts and raw materials produced or used under the management of the system that are products, parts and raw materials treated as wastes and products, parts and raw materials currently being used in the market. Further, in the recycle information memory database 101b, there is registered (stored) as recycle information the information required in executing each recycle processing shown in FIG. 1. Details of this information will be described later.

The virtual recycle product designing section 102 has a function as a recycle recovery estimating unit for estimating times when products, parts and raw materials that can be used for recycling are recovered together with their volumes, based on the recycle information stored in the recycle information memory database 101b, and a function as a virtual recycle product designing unit for inputting planned contents of a virtual product to be described later, preparing at least one proposal of a composition of the virtual product, making a decision as to whether it is possible or not to compose the virtual product using the reutilizable products, parts and raw materials based on the composition proposal and the recycle information, and designing a virtual recycle product using the reutilizable products, parts and raw materials that can compose the virtual product based on a result of the decision.

Further, the virtual recycle product designing section 102 designs a virtual recycle product according to market needs and needs of corporations. Other designing procedures will be described later.

Further, the virtual recycle product designing section 102 is provided with a specification limit input circuit 102a for inputting whether a part satisfies specification (part specification will be described later) or not at the time of designing, a recycle production estimating circuit 102b for deciding whether or not an output part satisfies specifications or for estimating costs, and a recycle production estimate output circuit 102c for outputting a result of the decision made by the recycle production estimating circuit 102b.

After the virtual recycle product designing has been carried out, specifications (component list) of the virtual recycle product, the number of the product that can be produced by recycling, and an optimum position of production, are decided. Then, parts are procured through the production scheduling section 103 for scheduling the production, and the product is produced.

The production scheduling section 103 inputs estimated recovery times of corresponding products, parts and raw materials together with their volumes, based on an output (a result of the designing) of the virtual recycle product designing section 102, and designs a production schedule of the recycle product using the reutilizable products, parts and raw materials.

The part procuring section 104 procures corresponding parts from the virtual warehouse 101, based on the production schedule set by the production scheduling section 103. In this case, when an assigned part is being mounted on a product currently under use in the market, the procurement includes the case of forcibly recovering the corresponding product.

The producing section 105 produces the product according to the production schedule set by the production scheduling section 103, by using the parts procured by the part procuring section 104.

The selling section 106 sells the product produced by the producing section 105. After the product has been sold in the market, the recycle information of the product sold is registered (or registered, or updated) in the recycle information memory database 101b.

Next, the recycle information to be registered in the recycle information memory database 101b will be explained in detail. FIG. 4 is an explanatory table for showing one example of information (recycle information) necessary for registering in the recycle information memory database 101b.

At first, the recycle information 401 is broadly classified into product information 402, part information 403 and material information 404.

The product information 402, the part information 403 and the material information 404 are further classified into initial manufacturing information 405 and change information 406 respectively.

When the above necessary information is recorded for each classification in the recycle information memory database 101b, it is possible to efficiently store the utilizable recycle information 401 at the time of producing the virtual recycle product.

The initial manufacturing information 405 and the change information 406 are provided with life cycle stage Nos. for using corresponding information contents. The life cycle stage No. shows in number at what stage each information content is necessary in the recycling system shown in FIG. 1. Each life cycle stage shows in FIG. 2.

The product information 402 will be explained in detail with reference to FIG. 5.

As shown in FIG. 5, the initial manufacturing information 405 of the product information 402 includes as the contents of the information, product name, machine type number, product ID, cost, lot number, parts mounted, place of manufacture, name of manufacturer, specifications, owner, user, place of use, selling mode, service mode, estimated service life, recycle part information, design change information, recycling factor, conformity with other type of machine, option information, maintenance schedule, number of production, and manufacturing date.

The contents of each piece of information are basically as described in words. The contents of information that require explanation will be described in detail. First, the product ID refers to a number attached to each individual product. In the case of a copying machine, the specification refers to a copying system, sizes of drafts, sizes of copying paper, copying speed, kinds of supplies (photo conductor, toner, and the like), etc.

The selling mode is the information on the method of selling, such as whether a product is sold through a mass market or through home-visit sales. The service information includes information on maintenance of each product and stock of replacement parts at the time of replacing parts. The life information is the information on the life of a product in terms of hours or number of sheets, or the like. The recycle part information includes the information on where a recycle part is used in a product, what recycle processing has been applied to the recycle part, and how many times the recycle product has been recycled. The conformity with other type of machine is the information on conformity of this product, particularly each unit of product, with other type of machine.

The option information is the information for showing which automatic document feed (ADF) or sorter is used in the product main body, in the case of a copying machine, for example. The maintenance schedule is the information for showing what are replacement parts or cleaning parts, etc, within the service life the product, or how often (hours) or after how many sheets the maintenance is carried out.

As shown in FIG. 5, the change information 406 of the product information 402 includes as the contents of the information, owner, user, place of use, use period, consumption value (CV), remaining service life, option addition/deletion, version information, use environment, service mode, repair history (replacement of parts), quality history, and recycle state information.

The contents of each piece of information are basically as described in words. The contents of information that require explanation will be described in detail. First, the owner, the user, the place of use and the use period show respectively the information at the time of producing a virtual recycle product. The CV is the information for showing how many sheets of copy paper have been used by this product. The remaining service life is the information for showing how many sheets of copy paper can be used or how long the product can be used till the end of the service life of the product. The option addition/deletion is the information for showing which option has been added or deleted in the option information (option information in the initial manufacturing information of the product information). The use environment is the information for showing at what place the product is being used or at what temperature and humidity the product is being used. The service mode is the information for showing the maintenance state of each part of the corresponding product. The quality history is the information for showing what kind of trouble the product has had. The recycle state information is the information for showing what kind of recycling has been done for the product or what kind of recycling has been done for parts that were mounted on the product at the times of maintenance.

The part information 403 will be explained in detail with reference to FIG. 6.

The initial manufacturing information 405 of the part information 403 includes part name, part number, part ID, cost, name of manufacturer, place of manufacture, date of manufacture, mounted product, cost, constituent materials, weight, size, quality information (tolerance, withstanding load, service life), reproducible material structure, recycled part or not, proportion of recycled material, design change information, and conformity information.

The contents of each piece of information are basically as described in words. The contents of information that require explanation will be described in detail. First, the quality information unit the information about external dimensions, withstanding load and service life including tolerance of the part. The reproducible material structure is the information for showing the structure of materials that can be recycled in the part. The recycled part or not is the information for showing whether the part is the recycled part or a new manufactured part. The proportion of recycle material is the information for showing the proportion of recycled parts in weight in the materials that constitute the part. The design change information is the information for showing a design change made of the part due to some inconvenience after the part has been mounted on a product and the product has been sold. The conformity information is the information for showing whether the part is in conformity as a recycle part.

The change information 406 of the part information 403 includes use time, use number of pieces, stress history, recycle history, information on quality change, history of mounted product, part reproduction information, remaining service life, final treatment information.

The contents of each piece of information are basically as described in words. The contents of information that require explanation will be described in detail. First, the stress history is the information for showing at what kind of stress-receiving position (dynamic and/or electric load for damaging the quality of the part) the part has been used. The recycle history is the information for showing to what extent the part has undergone various kinds of recycle processing in the recycling system shown in FIG. 1. The information on quality change is the information for showing how the quality has changed in the stress history information. The history of mounted product is the information for showing in what product the part has been used. In the case of a recycled part, this information shows a plurality of products. The remaining service life is the information for showing how long the part can be used by the end of its service life, for being placed for recycling. The final treatment information is the information for showing what kid of recycling will be done for the part after its service life.

The material information 404 will be explained in detail with reference to FIG. 7.

The initial manufacture information 405 of the material information 404 includes material name, raw material component, component ratio, and presence or absence of toxic substance. In this case, the material name shows the name of the material. The raw material component is the information for showing the contents of components of raw materials before they are processed/mixed as the material. The component ratio is the information for showing the proportion of the above raw material. The presence or absence of toxic substance is the information for showing a substance that affects the environments and human bodies.

The change information 406 of the material information 404 includes material component, component ratio, and mixed volume of impurity. In this case, the material component is the information for showing the components of the material when the components have changed from those of the original material due to chemical changes or the like at the time of using the material. The component ratio is the information for showing the proportion of the above material components. The mixed volume of impurity is the information for showing to what extent what is called impurities such as, for example, a toner, a grease and others are mixed into the material at the time of using the material.

The above shows the contents of the recycle information 401 necessary for carrying out each recycle processing in the recycling system shown in FIG. 1. However, in the present embodiment, the recycling of a copying machine in the recycling system is taken up as an example. Accordingly, when a recycling of other than the copying machine is to be carried out among various kinds of products and parts, it is necessary to sequentially add to the recycle information memory database 101b the information particularly required for this recycling as the recycle information 401.

Further, the recycle information 401 is provided corresponding to all the products, parts and materials on the virtual warehouse 101. Further, the recycle information 401 is broadly classified into the product information 402, the part information 403 and the material information 404 as shown in FIG. 4. Further, the part information 403 has information on mounted product. It is possible to specify a product based on the information of the mounted product. As the information on the place of using the product exists in the product information 402 of the specified product, it is possible to specify a storage position or an installation position of all the products and parts by using the recycle information 401. Accordingly, it is possible to utilize the recycle information 401 as the warehouse information.

Figure 8:
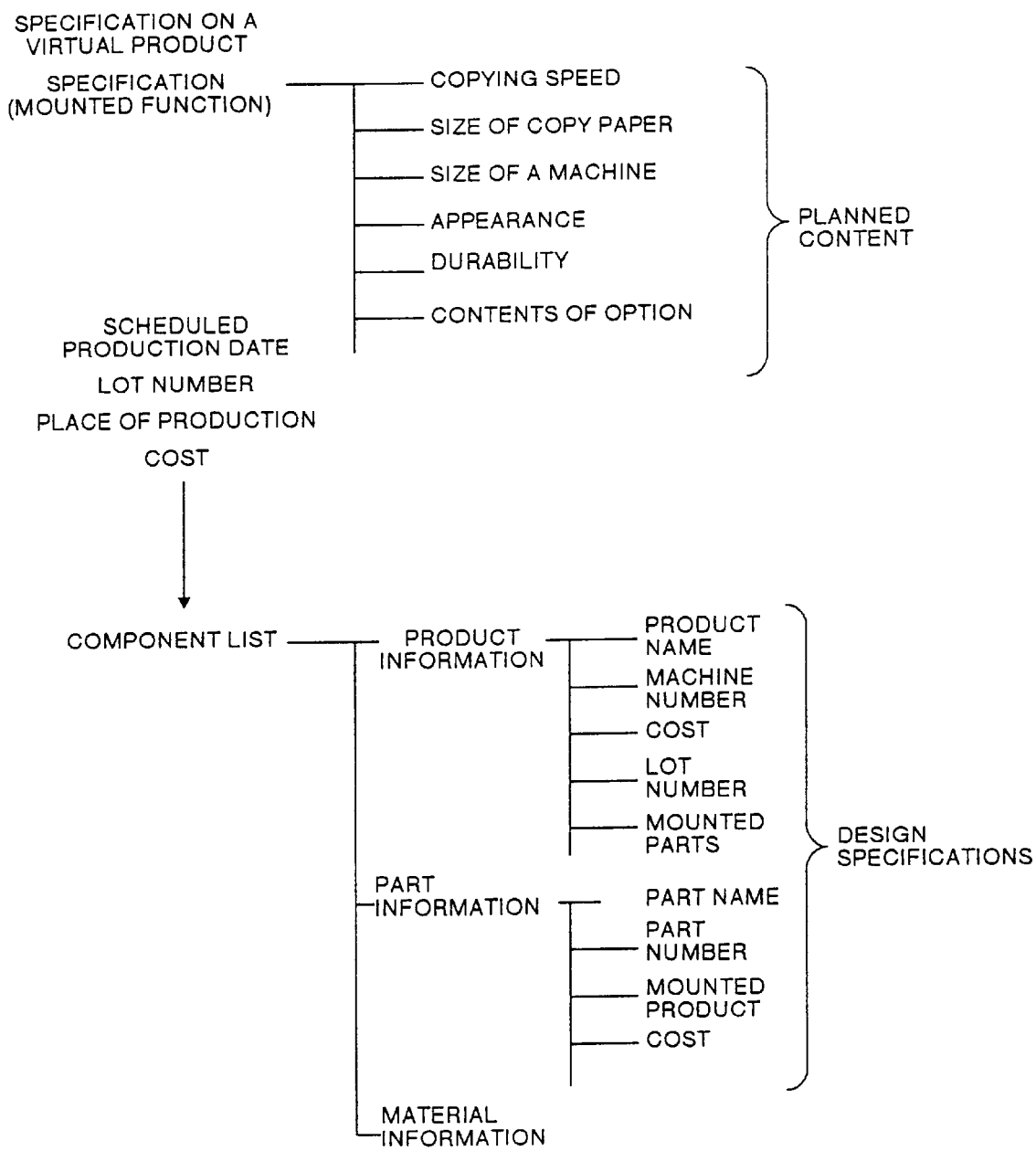
FIG. 8 is an explanatory drawing for showing one example of specifications of a virtual recycle product produced as an output.

Operation of the virtual recycle product designing section 102 will be explained in detail below. FIG. 8 shows one example of the specifications of a virtual product to be output as the virtual recycle product utilizing a recycled part. As shown in FIG. 8, the specifications of the virtual product are classified into plan contents and design specifications.

At first, the plan contents of the virtual recycle product will be explained. Specifications (mounted functions) of the plan contents shows what kind of copying machine (copying speed, size of copying paper, size of the machine, appearance, durability, option contents, etc.) is to be provided, according to design needs and needs of corporations. Scheduled production date, lot number, place of production and cost are also items for constituting the plan contents. At the time of making this plan, a plurality of proposals are also made about how to recycle the product after the end of the life cycle in future.

The design specifications of a product will be explained below based on the plan contents (plan original proposal). Based on the above-described plan contents, a product and parts are designed. Then, a component list is prepared. The component list is a list for showing what kind of product is to be produced and what kind of parts are to be disposed at what positions by what number. In other words, the component list shows in a tree diagram drawing numbers of parts, and assembly drawing numbers including number of parts. Further, regarding the contents of the product and parts, the contents corresponding to those in the recycle information 401 shown in FIG. 4 are described in the component list.

Figure 9:
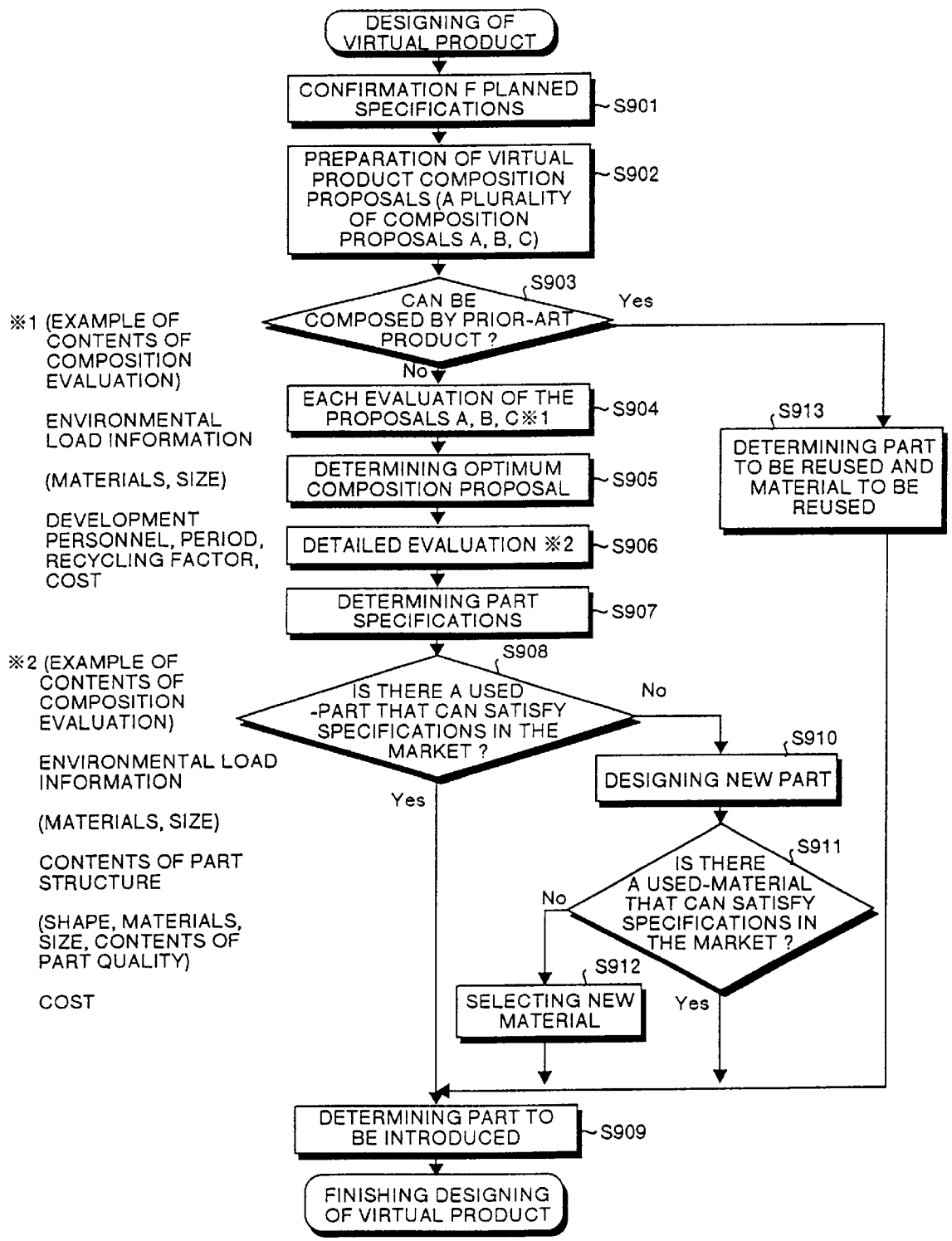
FIG. 9 is a flowchart for showing processing flows of a virtual recycle product designing circuit.

FIG. 9 is a flowchart for showing the flow of processing of the virtual recycle product designing section 102. At first, the plan contents (plan specifications) shown in FIG. 8 are confirmed (S901). Then, based on the plan contents, a virtual product composition proposal, that is a rough composition proposal of the virtual product, is prepared (S902). In this case, preparing the rough composition proposal is to make the whole layout of a copying machine, by determining a copying system, a paper carrying route, a draft scanning method, etc., in the case of a copying machine, for example. It is a matter of course that a plurality of composition proposals are investigated.

A decision is then made as to whether it is possible or not to structure a virtual product composition proposal by using a prior-art product (S903). When it is possible to compose the virtual product by using a prior-art product (S903: YES), recycle parts and materials are selected by using the recycle information 401 of the recycle information memory database 101b (S913). Thereafter, parts to be introduced are determined at step S909, and the designing of the virtual product is finished.

On the other hand, when it is not possible to compose the virtual product by using a prior-art product (S903: NO), ideas of a plurality of virtual product composition proposals (for example, A, B, C) are evaluated (S904). Then, an optimum composition proposal is determined (S905). The idea evaluation includes the evaluation on the magnitude of environmental load (kinds of materials and their sizes), number of development personnel, development period, recycling factor of each part, cost, etc.

A detailed evaluation is then carried out based on the optimum composition proposal determined (S906). Thereafter, parts specifications are determined (S907). In this case, the parts evaluation includes detailed evaluation on values of environmental load information (materials and their sizes), contents of part structures (shapes, materials, sizes and qualities of parts of which tolerances have been determined are evaluated), and costs.

Subsequently, based on the part specifications determined at the step S907, a decision is made as to whether or not there exist reused parts that satisfy the part specifications in the mark, by using the recycle information 401 of the recycle information memory database 101b (S908). In this case, when there exist reused parts in the market (S908: YES), parts to be introduced are determined at step S909, and the designing of the virtual product finishes.

On the other hand, when there do not exist reused parts (S908: NO), a new part is designed for a corresponding part, and specifications of materials to be used are determined (S910) Next, a decision is made as to whether or not there exist reused materials that satisfy the specifications in the market (S911). When there exist reused materials in the market (S911: YES), parts to be introduced are determined at step S909, and the designing of the virtual product finishes. On the other hand, when there do not exist reused materials in the market (S911: NO), new materials are selected (S912), and parts to be introduced are determined at the step S909, and the designing of the virtual product finishes.

After the designing work has been carried out in the above-described steps, the component list as shown in FIG. 8 is prepared and output. As the component list that includes the information on the procurement of parts, the recycle information 401 (product information 402, the part information 403 and the material information 404) is output as described above. This includes information on part existence areas, operation information including, part use periods, estimated use completion times, and firm information on completion of product use based on users expression of intentions, and information on product lot numbers and part production periods.

Further, the virtual recycle product designing section 102 may further input design priority condition information for designing a virtual product or parts of the virtual product, and designs the virtual recycle product based on the design priority condition information. As the design priority condition information, there may be used, for example, information for showing priority orders of costs, a recycling factor, legal regulations, conformity with standards, materials, delivery date, or/and volumes. By inputting the design priority condition information, it is possible to design a virtual recycle product using parts of the earliest delivery date (that is, the recovery time and volume are sufficient), by placing the highest priority to the delivery date.

Figure 10:
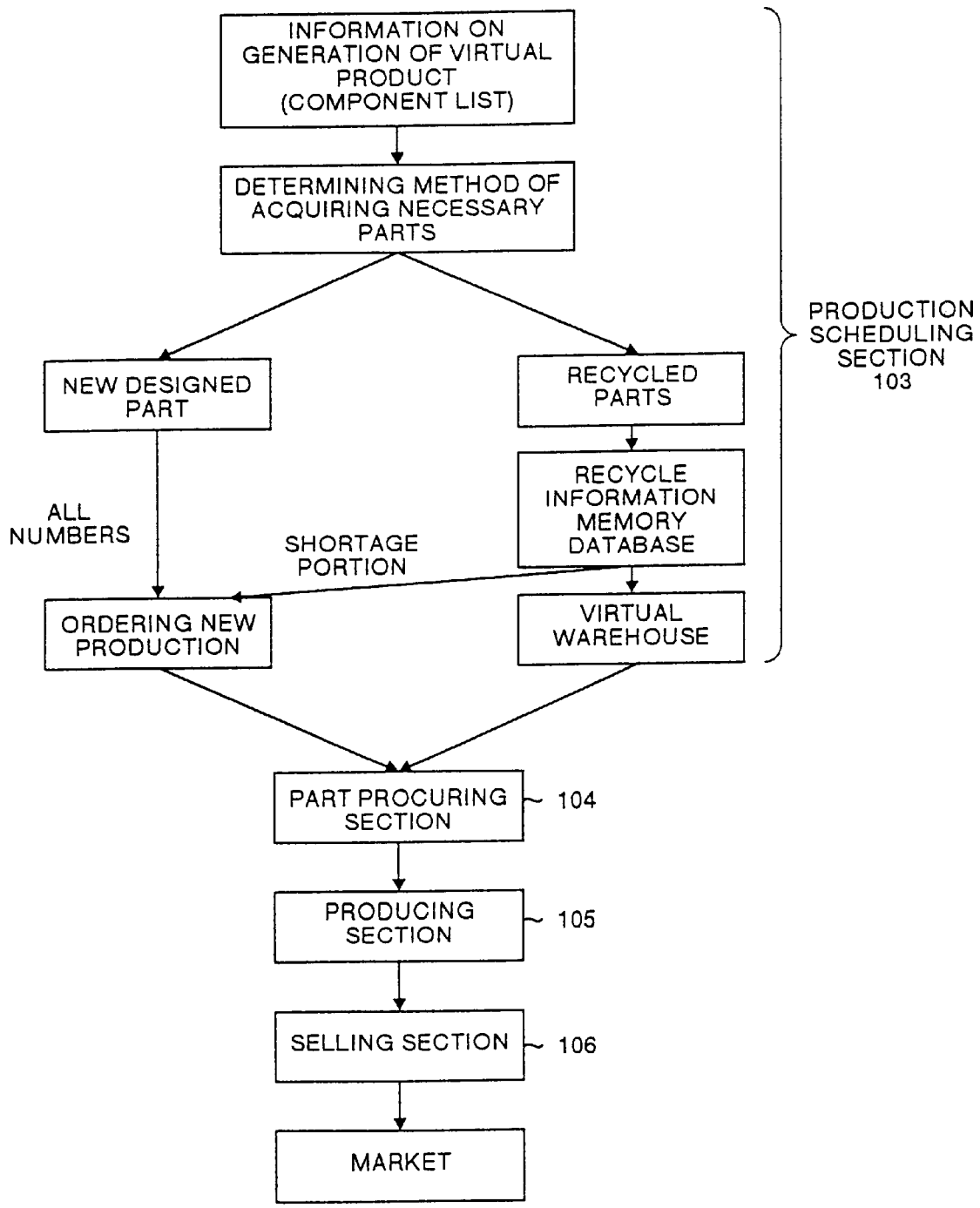
FIG. 10 is an explanatory drawing for showing flows of a production scheduling section.

Next, the operation of the production scheduling section 103 will be explained in detail. FIG. 10 is an explanatory drawing for showing the processing flow of the production scheduling section 103. The production scheduling section 103 is for making a production schedule based on the component list (information for generating a virtual product) determined by the virtual recycle product designing circuit.

Figure 3:
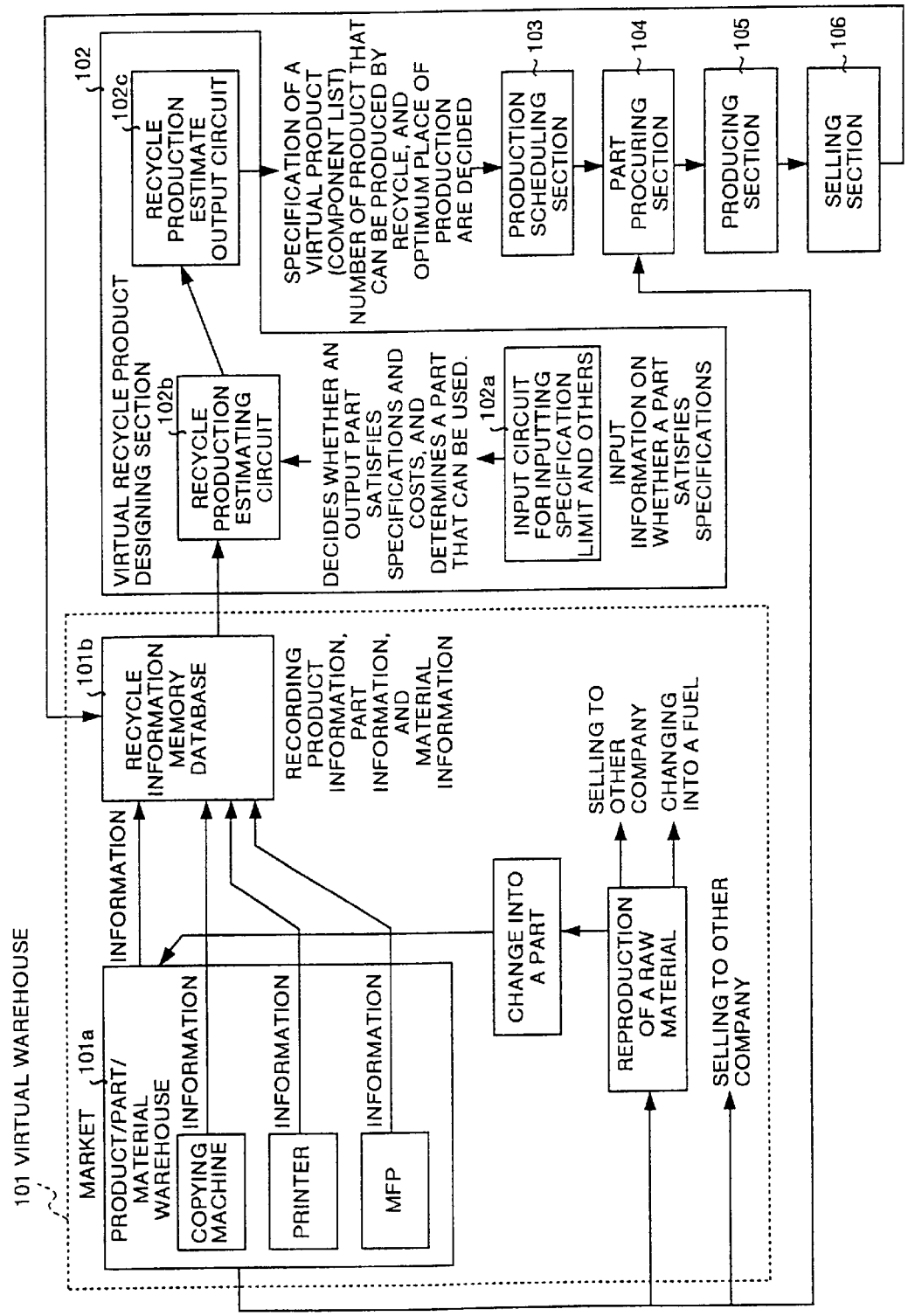
FIG. 3 shows a conceptual schematic drawing of a recycling system according to an embodiment of the present invention.

At first, as shown in FIG. 3, information is transmitted from the virtual recycle product designing section 102 to the production scheduling section 103, through the recycle production estimating circuit 102b and the recycle production estimate output circuit 102c. Then, a decision is made as to the component list, number of units that can be produced, optimum place of production, etc.

Thereafter, a necessary number of procurement of parts is determined. Subsequently, a shortage in the market (that is the product, part and material warehouse) is confirmed based on the recycle information 401 of the recycle information memory database 101b. Then, an order is placed for new design product, and a recovery instruction for recycle is given.

In this case, the production scheduling section 103 may further input delivery date, stock information, facility status, legal regulations, conformity with standards, or/and materials, as production limit information, and set a production schedule for the recycle product by judging the production limit control information.

Further, the production scheduling section 103 may further input production priority condition information for designing the production schedule of the recycle product, and design the production schedule of the recycle product, based on the production priority condition information. As the production priority condition information, there may be used, for example, the information for showing priority orders of costs, a recycling factor, legal regulations, conformity with standards, materials, delivery date, or/and volumes. By inputting the priority condition information, it is possible to set a production schedule of the recycle product that satisfies the delivery date, by placing the highest priority to the delivery date. Alternatively, it is also possible to produce the recycle product at low cost based on the schedule, by placing the highest priority to costs.

Thereafter, the part procuring section 104 procures parts. Then, the product (parts and materials) returns to the market through the producing section 105 and the selling section 106. In this case, the information on all product sold including the product using the recycled parts is newly registered as the recycle information 401 in the recycle information memory database 101b. In other words, in the present embodiment, as the market and the recycle information memory database 101b are assumed as a part of the virtual warehouse 101, the selling of the product in the market can be considered the same as storing the sold product in the virtual warehouse 101 as stock.

A product produced by the recycling system of the present embodiment is not a completely new product but is a recycled product using parts and the like once used in the market in at least a part of the product. Further, this recycled product may be a product in which the past functions are maintained with a prolonged service life. Alternatively, this recycled product may be an addition of a function to the past functions, or a deletion of a past function, or a combination of these. Further, new parts of a product may be parts of new functions or parts replaced because of the end of their service lives.

As explained above, the parts of a product in the recycling system of the present embodiment are being replaced by stage. During the period while the cycle of recycling is repeated by a plurality of times, all the parts of the product are replaced.

In order to achieve the above recycling system, it is necessary that a large-scale recycling plant for covering a wide area is installed at each suitable area to carry out a mass production of the recycle product. In this case, most of the centers and makers in FIG. 1 correspond to the recycling plant or part of the plant, although they are different depending on the stages of recycle processing.

Further, according to the recycling system of the present embodiment, it is possible to set a recycle production schedule in the recycling plants in a similar manner to that of producing new products in the conventional plants. Based on this recycle production schedule, it is possible to produce the recycle product systematically.

Further, according to the recycling system of the present embodiment, while it is possible to produce a recycle product systematically or based on schedules, it is also possible to recover products (parts) systematically or based on schedules, to match the production schedule. As a result, it is possible to achieve a planned recovery without generating waste of resources.

3) Use of the Recycling System of the Present Embodiment

Finally, use of the recycling system according to the present invention will be described below based on the above-described concept of the recycling system of the present invention and the recycling system of the present embodiment.

According to the recycling system of the present invention, the present invention has an object of systematically producing a recycle product using recycled parts and others. In order to achieve this object, the recycling system has various functions (means). Thus, the concept of a systematic recovery of products arises from the systematic production of the recycle product. Therefore, it is possible to propose a new mode of selling only the right of using functions of a product, not the product itself, to a customer (user) and charging the customer for this use, as an ideal business mode, by switching from the conventional business mode of production to selling and recovery of the product.

When the recycling system of the present invention is utilized together with the new business mode, it becomes possible to carry out a scheduled recovery based on a production schedule. This makes it possible to construct a more efficient recycling system.

Further, in the conventional business mode of selling a product, it is also possible to achieve a scheduled recovery by introducing such a system that a maker pays a recovery charge (what is called a part charge) to a customer and replaces the customer's product with an equivalent product or a product with improved function, at the time of recovering the product from the customer.

At first it may appear useless (expensive) to recover a product still in use in the market. However, this is not a useless act as the product disposed as waste according to the conventional practice is reborn as a recycle product. Particularly, when it is necessary to increase the function of a product during a short period of time after the user has started the use of the product, this product has been abandoned in the past. This has been a large waste of resources. Accordingly, achieving both a scheduled production and a scheduled recovery will bring about a large effect.

As explained above, according to the recycling system and recycling method of the present invention, information on all reutilizable products, parts and raw materials is stored in advance as recycle information. Based on this recycle information, times when these products, parts and raw materials can be recovered as products, parts and raw materials for recycling are estimated together with their volumes. Then, based on the estimated times and volumes, a production schedule of a recycle product using the reutilizable products, parts and raw materials, is set. Therefore, it is possible to systematically produce the recycle product using recycled parts and others.

Further, according to the recycling system and recycling method of the present invention, at least one proposal of a composition of a virtual product is prepared by inputting a planned content of the virtual product. Based on the composition proposal and the recycle information, a decision is made as to whether it is possible or not to compose the virtual product using the reutilizable products, parts and raw materials. Then, based on a result of the decision, a virtual recycle product using the reutilizable products, parts and raw materials that can compose the virtual product, is designed. Therefore, it is easily possible to systematically produce the recycle product using recycled parts and others based on a result of the designing of the virtual recycle product.

Further, according to the recycling system and recycling method of the present invention, the estimated recovery times and volumes of products, parts and raw materials to be used for the virtual recycle product, are input based on a result of the designing of the virtual recycle product. Then, a production schedule of the recycle product using the reutilizable products, parts and raw materials, is set. Therefore, it is possible to systematically produce the recycle product using recycled parts and others.

Further, according to the recycling system and recycling method of the present invention, the recycle information is warehouse information including product information on reutilizable products, part information on reutilizable parts, and material information on reutilizable raw materials, and for specifying at least storage positions or installation positions of the reutilizable products, parts and raw materials. Therefore, it is possible to manage all the products in the recycling system during the period from when the products are sold till when they are recovered. It is also possible to systematically utilize products in the market as parts and materials of a recycle product.

As explained above, according to the recycling system and recycling method of one aspect of this invention, information on all reutilizable products, parts and raw materials is stored in advance as recycle information. Based on this recycle information, times when these products, parts and raw materials can be recovered as products, parts and raw materials for recycling are estimated together with their volumes. Then, based on the estimated times and volumes, a production schedule of a recycle product using the reutilizable products, parts and raw materials, is set. Therefore, there is an advantage that the recycle products can be systematically manufactured using the reutilizable products, parts and raw materials.

Further, according to the recycling system and recycling method of another aspect of this invention, at least one proposal of a composition of a virtual product is prepared by inputting a planned content of the virtual product. Based on the composition proposal and the recycle information, a decision is made as to whether it is possible or not to compose the virtual product using the reutilizable products, parts and raw materials. Then, based on a result of the decision, a virtual recycle product using the reutilizable products, parts and raw materials that can compose the virtual product, is designed. Therefore, there is an advantage that the recycle products can be systematically and easily manufactured from the result of designing of the virtual recycle product using the reutilizable products, parts and raw materials.

Further, according to the recycling system and recycling method of still another aspect of this invention, the estimated recovery times and volumes of products, parts and raw materials to be used for the virtual recycle product, are input based on a result of the designing of the virtual recycle product. Thus, a production schedule of the recycle product using the reutilizable products, parts and raw materials, is set. Therefore, there is an advantage that the recycle products can be systematically manufactured using the reutilizable products, parts and raw materials.

Further, the recycle information is warehouse information including product information on reutilizable products, part information on reutilizable parts, and material information on reutilizable raw materials, and for specifying at least storage positions or installation positions of the reutilizable products, parts and raw materials. Therefore, there is an advantage that all the products can be managed with this recycle system after the sale of the products even if the products are yet to be withdrawn. In addition, the products in the market can be used as the parts and raw material of the recycled products.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A recycling system for comprehensively managing a recycle processing from parts and materials constituting a product to a final stage of treating these parts and materials as solid wastes, the recycling system comprising:

a recycle information memory which stores as recycle information, information on product existence areas, operation information including product use periods, estimated use completion times, and firm information on completion of product use based on users expression of intentions, and information on product lot numbers and part production periods, information on all reutilizable products, parts and raw materials, including products, parts and raw materials produced or used under the management of the system, products, parts and raw materials treated as wastes and products, parts and raw materials currently being used in the market;

a recycle recovery estimating unit which estimates times when the reutilizable products, parts and raw materials are recovered as products, parts and raw materials usable for recycling as well as their volumes, based on the recycle information stored in said recycle information memory; and a recycle production schedule setting unit which sets a production schedule of a recycle product using the reutilizable products, parts and raw materials based on the times and volumes estimated by said recycle recovery estimating unit.

2. The recycling system according to claim 1, wherein the recycle information is warehouse information including product information on reutilizable products, part information on reutilizable parts, and material information on reutilizable raw materials, and for specifying at least storage positions or installation positions of the reutilizable products, parts and raw materials.

3. The recycling system according to claim 2, wherein the recycle information is warehouse information further including product information on parts utilizable by ordering or from stocks, and material information on raw materials utilizable by ordering or from stocks, and for specifying at least storage positions of the utilizable parts and raw materials.

4. A recycling system for comprehensively managing a recycle processing from parts and materials constituting a product to a final stage of treating these parts and materials as solid wastes, the recycling system comprising:

a recycle information memory which stores as recycle information, information on product existence areas, operation information including product use periods, estimated use completion times, and firm information on completion of product use based on users expression of intentions, and information on product lot numbers and part production periods, information on all reutilizable products, parts and raw materials, including products, parts and raw materials produced or used under the management of the system, products, parts and raw materials treated as wastes and products, parts and raw materials currently being used in the market; and a virtual recycle product designing unit which inputs planned contents of a virtual product, preparing at least one proposal of a composition of the virtual product, making a decision as to whether it is possible or not to compose the virtual product using the reutilizable products, parts and raw materials based on the composition proposal and the recycle information, and designing a virtual recycle product using the reutilizable products, parts and raw materials that can compose the virtual product based on a result of the decision.

5. The recycling system according to claim 4, wherein the recycle information is warehouse information including product information on reutilizable products, part information on reutilizable parts, and material information on reutilizable raw materials, and for specifying at least storage positions or installation positions of the reutilizable products, parts and raw materials.

6. The recycling system according to claim 5, wherein the recycle information is warehouse information further including product information on parts utilizable by ordering or from stocks, and material information on raw materials utilizable by ordering or from stocks, and for specifying at least storage positions of the utilizable parts and raw materials.

7. The recycling system according to claim 4, wherein the recycle information includes condition information on the use for a generation of a virtual product, and the virtual recycle product designing unit is for making a decision as to whether it is possible or not to compose the virtual product by using the reutilizable products, parts and raw materials, based on input of the condition information for a generation of a virtual product.

8. The recycling system according to claim 7, wherein the condition information includes information for showing conformity of a part or/and an aggregate of parts with a product.

9. The recycling system according to claim 7, wherein the condition information includes information for showing conformity of a part with a material.

10. The recycling system according to claim 7, wherein the condition information includes quality information including at least one of recycle history of parts, stress history of parts, and remaining life of parts.

11. The recycling system according to claim 7, wherein the condition information includes information on earth environmental load including at least one of the information on energy consumption volume and emission material.

12. The recycling system according to claim 7, wherein the condition information includes information on the inclusion of a toxic material.

13. The recycling system according to claim 7, wherein the condition information includes parts existence area information for assigning areas where parts to be used for producing a virtual product exist, virtual product production area information for assigning an area of producing the virtual product, and forced recovery information for assigning a forced recovery of products.

14. The recycling system according to claim 4, wherein said virtual recycle product designing unit is for inputting design specification information of products and/or parts for a virtual product as the planned contents of the virtual product.

15. The recycling system according to claim 4, wherein said virtual recycle product designing unit is for further inputting design limit information together with the planned contents of the virtual product.

16. The recycling system according to claim 15, wherein the design limit information includes at least one of costs on products or parts, a recycling factor, legal regulations, conformity with standards, and materials.

17. The recycling system according to claim 4, wherein said virtual recycle product designing unit is for further inputting design priority condition information for designing a virtual product or parts of the virtual product, and for designing the virtual recycle product based on the design priority condition information.

18. The recycling system according to claim 17, wherein the design priority condition information is information for showing priority orders of costs, a recycling factor, legal regulations, conformity with standards, materials, delivery dare, or/and volumes.

19. The recycling system according to claim 4, wherein said virtual recycle product designing unit makes a decision as to whether it is possible or not to compose the virtual product by using the reutilizable products, parts and raw materials based on the composition proposals and the recycle information, selects an optimum composition proposal from the composition proposals based on a result of the decision, and designs an optimum virtual recycle product based on the selected composition proposal.

20. A recycling system for comprehensively managing a recycle processing from parts and materials constituting a product to a final stage of treating these parts and materials as solid wastes, the recycling system comprising:

a recycle information memory which stores as recycle information, information on all reutilizable products, parts and raw materials, including products, parts and raw materials produced or used under the management of the system, products, parts and raw materials treated as wastes and products, parts and raw materials currently being used in the market;

a recycle recovery estimating unit which estimates times when the reutilizable products, parts and raw materials are recovered as products, parts and raw materials usable for recycling as well as their volumes, based on the recycle information stored in said recycle information memory;

a virtual recycle product designing unit which inputs planned contents of a virtual product, preparing at least one proposal of a composition of the virtual product, making a decision as to whether it is possible or not to compose the virtual product using the reutilizable products, parts and raw materials based on the composition proposal and the recycle information, and designing a virtual recycle product using the reutilizable products, parts and raw materials that can compose the virtual product based on a result of the decision; and a recycle production schedule setting unit which sets a production schedule of a recycle product using the reutilizable products, parts and raw materials, by inputting estimated recovery times and volumes of the corresponding products, parts and raw materials from said recycle recovery estimating unit, based on a result of said designing by the virtual recycle product designing unit.

21. The recycling system according to claim 20, wherein the recycle information is warehouse information including product information on reutilizable products, part information on reutilizable parts, and material information on reutilizable raw materials, and for specifying at least storage positions or installation positions of the reutilizable products, parts and raw materials.

22. The recycling system according to claim 21, wherein the recycle information is warehouse information further including product information on parts utilizable by ordering or from stocks, and material information on raw materials utilizable by ordering or from stocks, and for specifying at least storage positions of the utilizable parts and raw materials.

23. The recycling system according to claim 20, wherein the recycle information includes information on product existence areas, operation information including, product use periods, estimated use completion times, and firm information on completion of product use based on users expression of intentions, and information on product lot numbers and part production periods.

24. The recycling system according to claim 20, wherein the recycle information includes condition information on the use for a generation of a virtual product, and the virtual recycle product designing unit is for making a decision as to whether it is possible or not to compose the virtual product by using, the reutilizable products, parts and raw materials, based on input of the condition information for a generation of a virtual product.

25. The recycling system according to claim 24, wherein the condition information includes information for showing conformity of a part or/and an aggregate of parts with a product.

26. The recycling system according to claim 24, wherein the condition information includes information for showing conformity of a part with a material.

27. The recycling system according to claim 24, wherein the condition information includes quality information including at least one of recycle history of parts, stress history of parts, and remaining life of parts.

28. The recycling system according to claim 24, wherein the condition information includes information on earth environmental load including at least one of the information on energy consumption volume and emission material.

29. The recycling system according to claim 24, wherein the condition information includes information on the inclusion of a toxic material.

30. The recycling system according to claim 24, wherein the condition information includes parts existence area information for assigning areas where parts to be used for producing a virtual product exist, virtual product production area information for assigning an area of producing the virtual product, and forced recovery information for assigning a forced recovery of products.

31. The recycling system according to claim 20, wherein said virtual recycle product designing unit is for inputting design specification information of products and/or parts for a virtual product as the planned contents of the virtual product.

32. The recycling system according to claim 20, wherein said virtual recycle product designing unit is for further inputting design limit information together with the planned contents of the virtual product.

33. The recycling system according to claim 32, wherein the design limit information includes at least one of costs on products or parts, a recycling factor, legal regulations, conformity with standards, and materials.

34. The recycling system according to claim 20, wherein said virtual recycle product designing unit is for further inputting design priority condition information for designing a virtual product or parts of the virtual product, and for designing the virtual recycle product based on the design priority condition information.

35. The recycling system according to claim 34, wherein the design priority condition information is information for showing priority orders of costs, a recycling factor, legal regulations, conformity with standards, materials, delivery date, or/and volumes.

36. The recycling system according to claim 20, wherein said virtual recycle product designing unit is for outputting virtual design information on a virtual recycle product as a result of a designing of the virtual recycle product.

37. The recycling system according to claim 36, wherein the virtual design information has information on at least a group of part components.

38. The recycling system according to claim 36, wherein said recycle production schedule setting unit is for inputting virtual design information from said virtual recycle product designing unit and for outputting information on procurement of parts necessary for producing a virtual product meeting the input virtual design information.

39. The recycling system according to claim 38, wherein the information on the procurement of parts includes information on part existence areas, operation information including, part use periods, estimated use completion times, and firm information on completion of product use based on users expression of intentions, and information on product lot numbers and part production periods.

40. The recycling system according to claim 20, wherein said virtual recycle product designing unit makes a decision as to whether it is possible or not to compose the virtual product by using the reutilizable products, parts and raw materials based on the composition proposals and the recycle information, selects an optimum composition proposal from the composition proposals based on a result of the decision, and designs an optimum virtual recycle product based on the selected composition proposal.

41. The recycling system according to claim 20, wherein said recycle production schedule setting unit further inputs delivery date, stock information, facility status, legal regulations, conformity with standards and/or materials as production limit information, and sets a production schedule for the recycle product based on a judgement of a production limit control.

42. The recycling system according to claim 41, wherein said recycle production schedule setting unit further inputs production priority condition information for designing a production schedule of a recycle product, and designs the production schedule of the recycle product based on the production priority condition information.

43. The recycling system according to claim 42, wherein the production priority condition information is information for showing priority orders of costs, a recycling factor, legal regulations, conformity with standards, materials, delivery date, or/and volumes.

44. A recycling system for comprehensively managing a recycle processing from parts and materials constituting a product to a final stage of treating these parts and materials as solid wastes, the recycling system comprising:

a recycle information memory means for storing as recycle information, information on product existence areas, operation information including product use periods, estimated use completion times, and firm information on completion of product use based on users expression of intentions, and information on product lot numbers and part production periods, information on all reutilizable products, parts and raw materials, including products, parts and raw materials produced or used under the management of the system, products, parts and raw materials treated as wastes and products, parts and raw materials currently being used in the market;

a recycle recovery estimating means for estimating times when the reutilizable products, parts and raw materials are recovered as products, parts and raw materials usable for recycling as well as their volumes, based on the recycle information stored in said recycle information memory means; and a recycle production schedule setting means for setting a production schedule of a recycle product using the reutilizable products, parts and raw materials based on the times and volumes estimated by said recycle recovery estimating means.

45. A recycling system for comprehensively managing a recycle processing from parts and materials constituting a product to a final stage of treating these parts and materials as solid wastes, the recycling system comprising:

a recycle information memory means for storing as recycle information, information on product existence areas, operation information including product use periods, estimated use completion times, and firm information on completion of product use based on users expression of intentions, and information on product lot numbers and part production periods, information on all reutilizable products, parts and raw materials, including products, parts and raw materials produced or used under the management of the system, products, parts and raw materials treated as wastes and products, parts and raw materials currently being used in the market; and a virtual recycle product designing means for inputting planned contents of a virtual product, preparing at least one proposal of a composition of the virtual product, making a decision as to whether it is possible or not to compose the virtual product using the reutilizable products, parts and raw materials based on the composition proposal and the recycle information, and designing a virtual recycle product using the reutilizable products, parts and raw materials that can compose the virtual product based on a result of the decision.

46. A recycling system for comprehensively managing a recycle processing from parts and materials constituting a product to a final stage of treating these parts and materials as solid wastes, the recycling system comprising:

a recycle information memory means for storing as recycle information, information on all reutilizable products, parts and raw materials, including products, parts and raw materials produced or used under the management of the system, products, parts and raw materials treated as wastes and products, parts and raw materials currently being used in the market;

a recycle recovery estimating means for estimating times when the reutilizable products, parts and raw materials are recovered as products, parts and raw materials usable for recycling as well as their volumes, based on the recycle information stored in said recycle information memory means;

a virtual recycle product designing means for inputting planned contents of a virtual product, preparing at least one proposal of a composition of the virtual product, making a decision as to whether it is possible or not to compose the virtual product using the reutilizable products, parts and raw materials based on the composition proposal and the recycle information, and designing a virtual recycle product using the reutilizable products, parts and raw materials that can compose the virtual product based on a result of the decision; and a recycle production schedule setting means for setting a production schedule of a recycle product using the reutilizable products, parts and raw materials, by inputting estimated recovery times and volumes of the corresponding products, parts and raw materials from said recycle recovery estimating unit, based on a result of said designing by the virtual recycle product designing means.

47. A recycling method for comprehensively managing a recycle processing from parts and materials constituting a product to a final stage of treating these parts and materials as solid wastes, the recycling method comprising the steps of:

storing as recycle information, information on product existence areas, operation information including product use periods, estimated use completion times, and firm information on completion of product use based on users expression of intentions, and information on product lot numbers and part production periods, information on all reutilizable products, parts and raw materials, including products, parts and raw materials produced or used under the management of the system, products, parts and raw materials treated as wastes and products, parts and raw materials currently being used in the market;

estimating times when the reutilizable products, parts and raw materials are recovered as products, parts and raw materials usable for recycling as well as their volumes, based on the recycle information stored in said storing step; and setting a production schedule of a recycle product using the reutilizable products, parts and raw materials based on the times and volumes estimated by said estimating step.

48. A recycling method for comprehensively managing a recycle processing from parts and materials constituting a product to a final stage of treating these parts and materials as solid wastes, the recycling method comprising the steps of:

storing as recycle information, information on product existence areas, operation information including product use periods, estimated use completion times, and firm information on completion of product use based on users expression of intentions, and information on product lot numbers and part production periods, information on all reutilizable products, parts and raw materials, including products, parts and raw materials produced or used under the management of the system, products, parts and raw materials treated as wastes and products, parts and raw materials currently being used in the market; and inputting planned contents of a virtual product, preparing at least one proposal of a composition of the virtual product, making a decision as to whether it is possible or not to compose the virtual product using the reutilizable products, parts and raw materials based on the composition proposal and the recycle information, and designing a virtual recycle product using the reutilizable products, parts and raw materials that can compose the virtual product based on a result of the decision.

49. A recycling method for comprehensively managing a recycle processing from parts and materials constituting a product to a final stage of treating these parts and materials as solid wastes, the recycling method comprising the steps of:

storing as recycle information, the information on all reutilizable products, parts and raw materials including products, parts and raw materials produced or used under the management of the system that are products, parts and raw materials treated as wastes and products, parts and raw materials currently being used in the market;

estimating times when the reutilizable products, parts and raw materials are recovered as products, parts and raw materials usable for recycling as well as their volumes, based on the recycle information stored in said storing step;

inputting planned contents of a virtual product, preparing at least one proposal of a composition of the virtual product, making a decision as to whether it is possible or not to compose the virtual product using the reutilizable products, parts and raw materials based on the composition proposal and the recycle information, and designing a virtual recycle product using the reutilizable products, parts and raw materials that can compose the virtual product based on a result of the decision; and setting a production schedule of a recycle product using the reutilizable products, parts and raw materials, by inputting estimated recovery times and volumes of the corresponding products, parts and raw materials from said estimating step, based on a result of the designing by said inputting step.

\* \* \* \* \*